(12) United States Patent
Herrera et al.

(10) Patent No.: US 7,284,527 B2
(45) Date of Patent: Oct. 23, 2007

(54) TUNED VIBRATION ABSORBER

(75) Inventors: Eric Herrera, Lincoln City, OR (US); Bilal A. Bazzi, Dearborn Heights, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/819,440

(22) Filed: Apr. 6, 2004

(65) Prior Publication Data

US 2004/0200682 A1 Oct. 14, 2004

Related U.S. Application Data

(60) Provisional application No. 60/461,153, filed on Apr. 8, 2003.

(51) Int. Cl.
*F02F 7/00* (2006.01)
(52) U.S. Cl. .................. 123/195 C; 267/136; 188/378; 123/90.37; 123/90.38
(58) Field of Classification Search ................ 188/378, 188/379, 380; 267/136, 141, 153, 141.1, 267/1, 141.7, 293, 292, 140.11, 140.13; 248/632, 248/638, 562; 123/195 C, 198 E, 90.37, 123/90.38
See application file for complete search history.

(56) References Cited

U.S. PATENT DOCUMENTS

| | | | | |
|---|---|---|---|---|
| 3,242,791 | A * | 3/1966 | Smith | 188/379 |
| 4,027,644 | A * | 6/1977 | Timour | 123/198 E |
| 4,067,531 | A * | 1/1978 | Sikula | 220/378 |
| 5,397,206 | A * | 3/1995 | Sihon | 411/544 |
| 5,494,269 | A * | 2/1996 | McCalmont | 269/224 |
| 5,513,603 | A * | 5/1996 | Ang et al. | 123/90.37 |
| 6,161,664 | A * | 12/2000 | Brevart et al. | 188/379 |
| 6,216,833 | B1 * | 4/2001 | Lefferts et al. | 188/380 |
| 6,227,784 | B1 * | 5/2001 | Antoine et al. | 411/369 |
| 6,321,890 | B1 * | 11/2001 | Suzuki et al. | 188/379 |
| 6,371,073 | B1 * | 4/2002 | Billimack et al. | 123/195 C |
| 6,453,892 | B1 * | 9/2002 | Plunkett et al. | 123/572 |
| 6,591,801 | B1 * | 7/2003 | Fonville | 123/90.38 |
| 6,685,197 | B1 * | 2/2004 | Rakauskas | 277/651 |

* cited by examiner

*Primary Examiner*—Devon C. Kramer
*Assistant Examiner*—Mariano Sy
(74) *Attorney, Agent, or Firm*—Harness, Dickey & Pierce, P.L.C.

(57) ABSTRACT

A tuned vibration absorber is disclosed that includes a base, a spring mounted to the base, and a mass mounted to the spring. The absorber is particularly, advantageous when mounted to a specific vehicle component via a mounting bolt that is already employed to mount that particular component. For example, a tuned vibration absorber may be mounted to a cam cover bolt on a cam cover in order to absorb undesirable vibrations at a particular frequency.

15 Claims, 6 Drawing Sheets

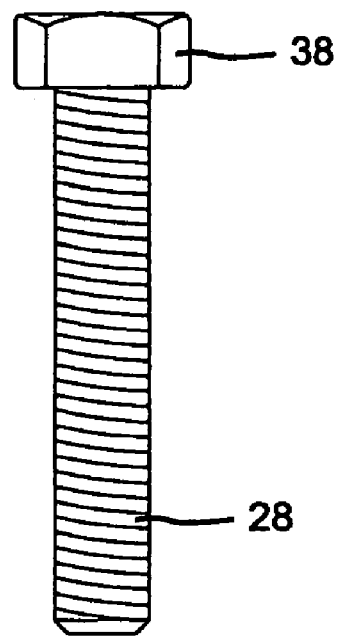
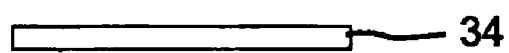
FIG 4
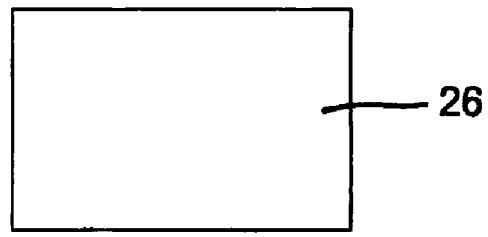
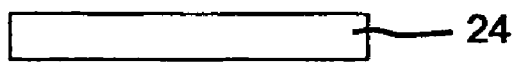
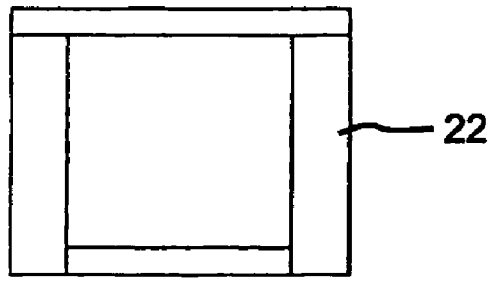

TUNED VIBRATION ABSORBER

CROSS-REFERENCE TO RELATED APPLICATIONS

This application claims the benefit of U.S. Provisional Application No. 60/461,153, filed on Apr. 8, 2003. The disclosure of the above application is incorporated herein by reference.

FIELD OF THE INVENTION

The present invention relates to vibration absorbers, and more particularly, to a tuned vibration absorber for vehicle components, appliances, or other mechanical devices.

BACKGROUND OF THE INVENTION

In particular vehicles, certain components may produce undesirable vibrations at a certain frequency. These vibrations may produce unwanted noise or vibrations that are transmitted to a vehicle passenger compartment or user of an appliance, which may be objectionable. In some cases, the vehicles or appliances may already be in service or the vibration may be particularly expensive or difficult to eliminate.

Thus, it is desirable to have a simple, compact, and inexpensive way to eliminate the vibrations from the particular vehicle or appliance component at that undesired frequency.

SUMMARY OF THE INVENTION

Accordingly, the present invention provides a vibration absorber for absorbing vibrational energy of a body. The vibration absorber includes a base member including an aperture for receiving a bolt therein. A spring member is mounted to the base member and a mass member is mounted to the spring member. A bolt extends through the aperture in the base member for mounting the base member to the body. The vibration absorber absorbs the vibrations in the vicinity of the bolt.

An advantage of an embodiment of the present invention is that the tuned vibration absorber can be added to a vehicle component even after the vehicle is in service.

Another advantage of an embodiment of the present invention is that the tuned vibration absorber is relatively inexpensive to manufacture.

A further advantage of an embodiment of the present invention is that the tuned vibration absorber is relatively easy to manufacture and assemble. Another advantage of an embodiment of the present invention is that the tuned vibration absorber is relatively compact and that the tuned vibration absorber can be formed integral with a vehicle component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is an exploded view of a tuned vibration absorber with the spring and mass separated from the base, and with a bolt assembly according to the principles of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1A:
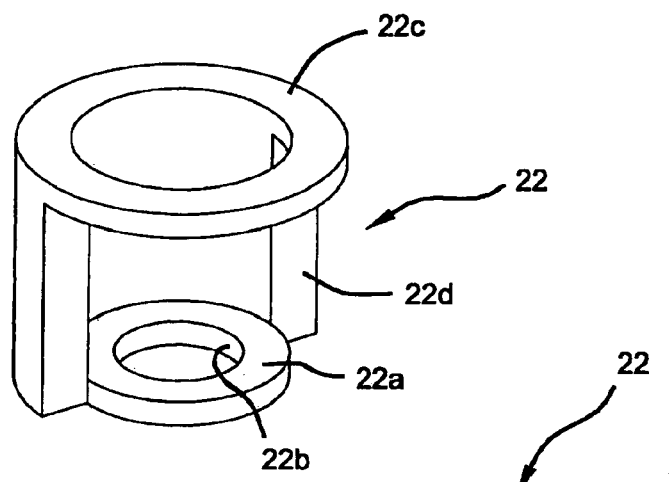
FIG. 1A is a perspective view of a tuned vibration absorber base according to the principles of the present invention.
Figure 1B:
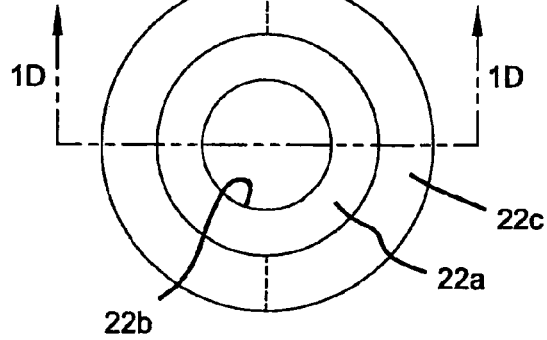
FIG. 1B is a top view of the vibration absorber base according to the principles of the present invention.
Figure 1C:
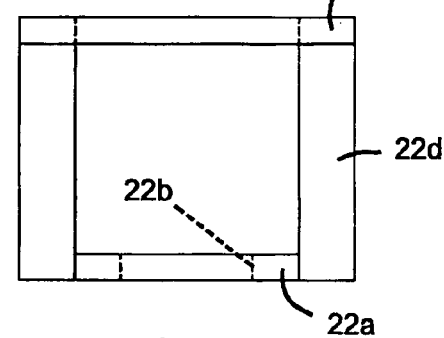
FIG. 1C is a side view of the tuned vibration absorber base according to the principles of the present invention.
Figure 1D:
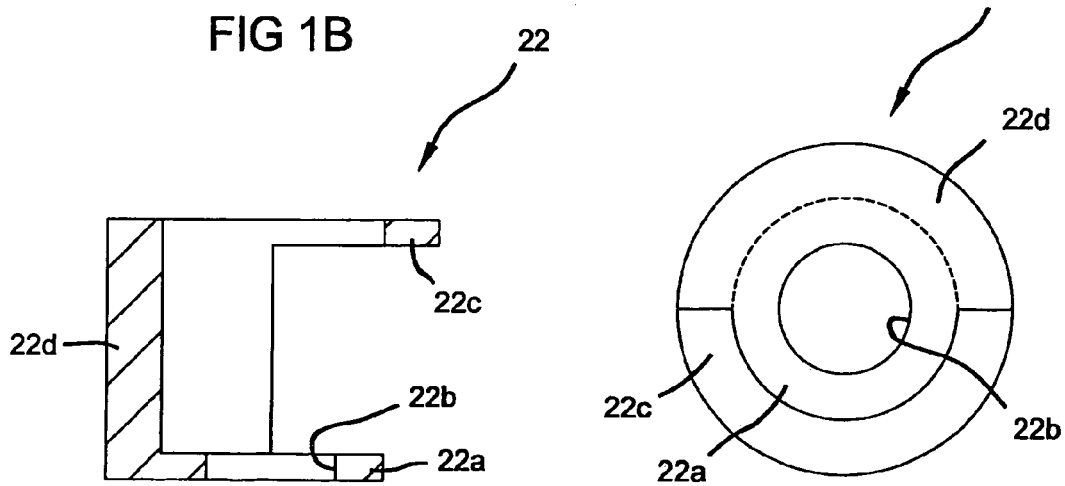
FIG. 1D is a cross-sectional view taken along line 1D-1D of FIG. 1B.
Figure 1E:
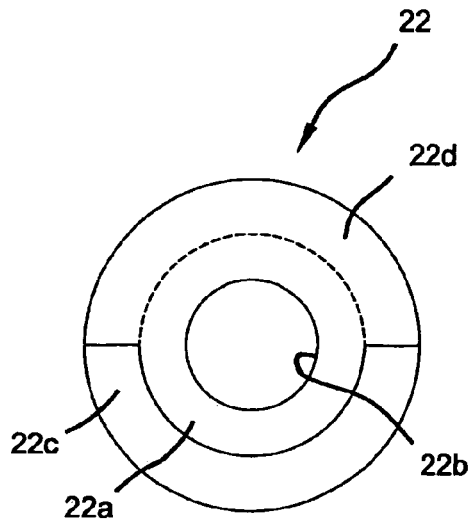
FIG. 1E is a bottom view of the vibration absorber base according to the principles of the present invention.
Figure 2:
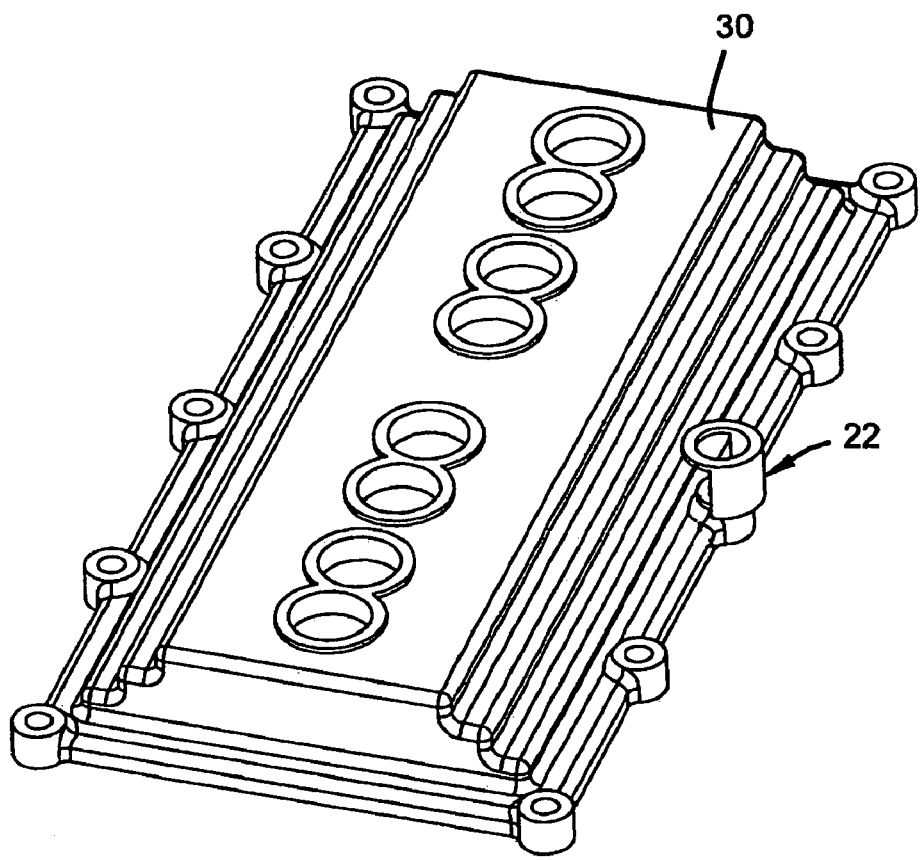
FIG. 2 is a perspective view of a cam cover having a tuned vibration absorber base mounted thereto according to the principles of the present invention.
Figure 3:
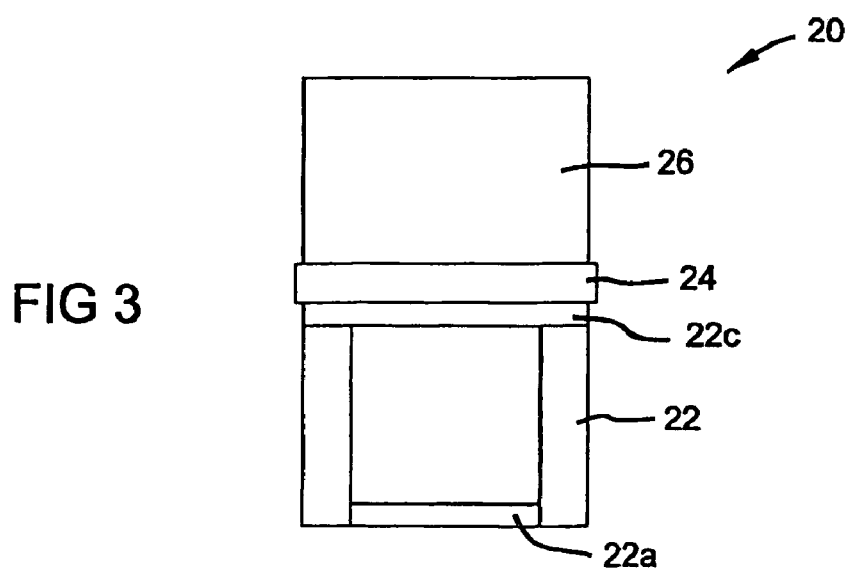
FIG. 3 is a side view of a tuned vibration absorber including a base, a spring, and a mass according to the principles of the present invention.

With reference to FIGS. 2-4, the tuned vibration absorber 20, according to the principles of the present invention, includes a base 22, a spring 24 mounted to the base 22, and a mass 26 mounted to the spring 24. The base 22, as illustrated in FIGS. 1A-1E is preferably formed from a stiff material, such as metal or plastic, depending upon the particular application for the absorber 20. The base includes a first mounting portion 22a including an aperture 22b and a second mounting portion 22c spaced from the first mounting portion 22a. A bridge portion 22d connects the first mounting portion 22a to the second mounting portion 22c such that the second mounting portion 22c is concentric with the first mounting portion 22a.

Figure 6:
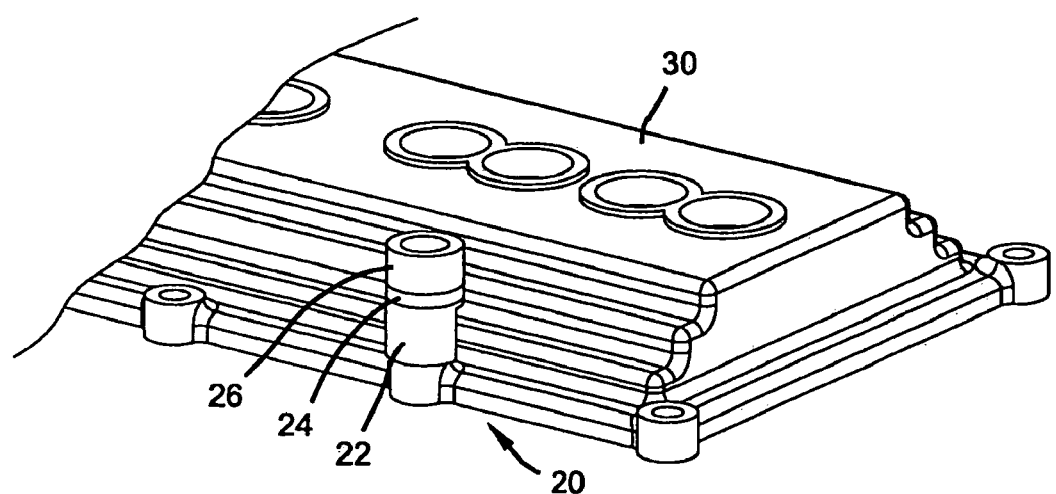
FIG. 6 is a perspective view of a cam cover having a tuned vibration absorber mounted to the cam cover according to the principles of the present invention.

The spring 24 is mounted to the second mounting portion 22c of the base 22 and is preferably formed of a material with good spring properties, such as, for example, silicone, hydrogenated-nitro-butyl rubber (NHBR), microcellular urethane, foamed silicone, and other foam-type resilient materials. Although other suitable materials and/or coil springs, may also be employed if so desired. As illustrated in FIG. 6, the mass 26 and spring 24 are ring or disk shaped and the spring 24 is secured to the second mounting portion 22c of the base 22 by an adhesive or by molding a portion of the spring 24 to the base 22 or by other typical means. The mass 26 is secured to the spring 24 in a similar manner.

The size of the mass 26 (i.e., the mass of the mass 26), and the spring rate of the spring are determined based on the particular frequency for which vibrational energy absorption is desired. In particular, the equation of motion for determining the spring rate and mass is as follows.

Writing the equations of motion:

$$M_1\ddot{x}_1 + K_{X1} - K_{X2} = F_0 \sin wt$$

$$M_2\ddot{x}_2 + K_{X2} - K_{X1} = 0$$

Figure 7:
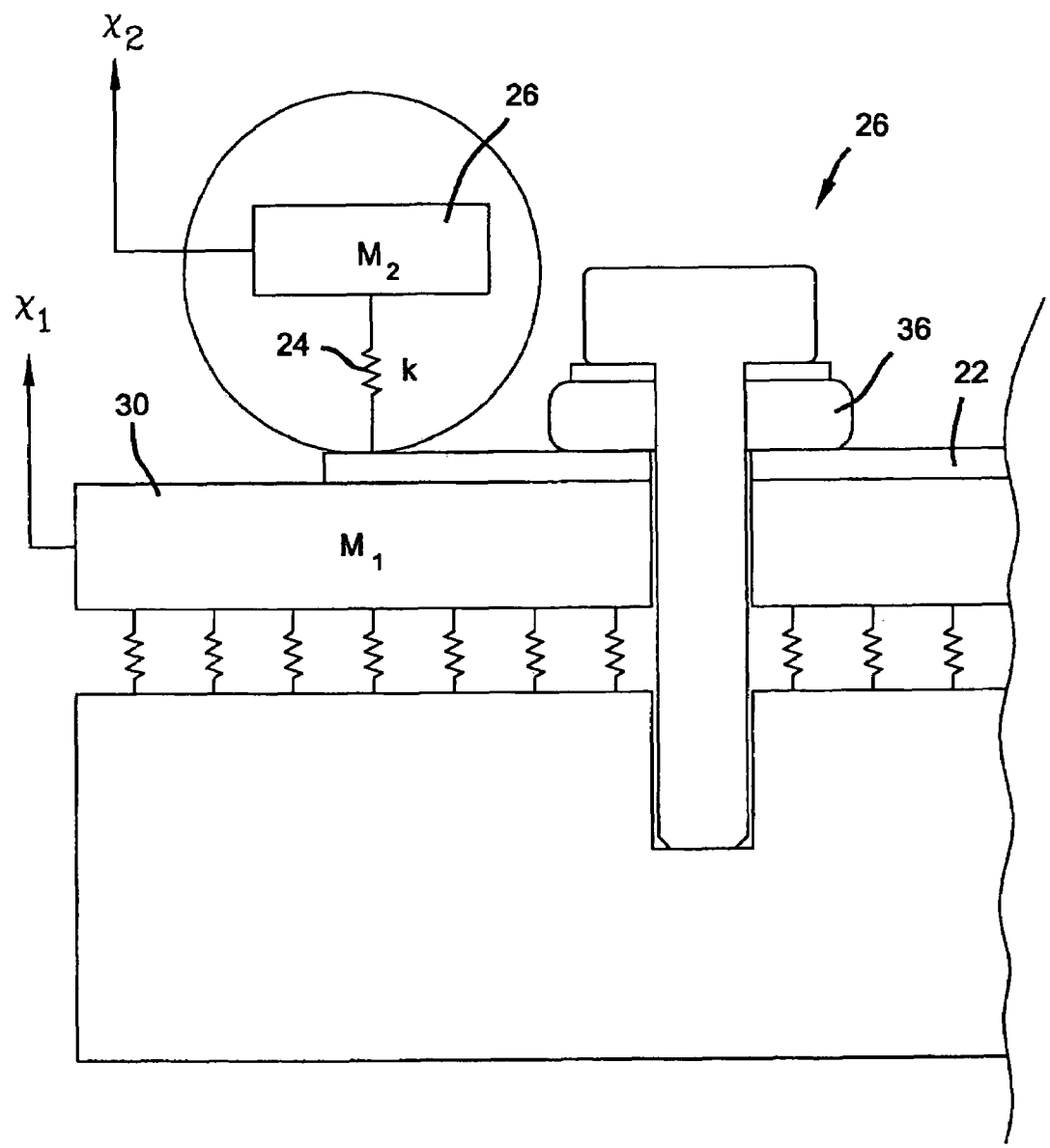
FIG. 7 is a schematic view of a cam cover mounted on an engine head and a tuned vibration absorber mounted to the cam cover/bolt assembly according to the principles of the present invention.

The values of X1, X2, M1, M2, and K are schematically illustrated in FIG. 7.

Solving these equations, the response of the system will be of the form:

$$x_1 = K \frac{\left(1 - \frac{w^2}{w_a^2}\right)\sin wt}{\left(1 - \frac{w^2}{W_a^2}\right)\left(1 + \frac{M_2}{M_1} - \frac{w^2}{W_n^2}\right) - \frac{M_2}{M_1}} \text{ and} \quad (1)$$

$$x_2 = K \frac{\sin wt}{\left(1 - \frac{w^2}{W_a^2}\right)\left(1 + \frac{M_2}{M_1} - \frac{w^2}{W_n^2}\right) - \frac{M_2}{M_1}} \quad (2)$$

where $w_a$=natural frequency of the vibration absorber
$w_n$=natural frequency of main system
w=input frequency (forcing frequency)
so when $w_a$=w, Equation 1 becomes $x_1$=0 and so the vibration of mass $M_1$ (cover) is minimal for that specific frequency.

The tuned vibration absorber is selected to include a mass ($M_2$) and spring constant K tuned to frequencies at which the cover has high vibrations and thus, minimizing those vibrations. This calculation is well known to one of ordinary skill in the art utilizing the above generally mathematical calculations for determining these values, although other analytical, computer aided modeling, and laboratory measurement techniques known to those skilled in the art may also be employed to determine the frequency of the undesired vibrations as well as the mass and spring stiffness required.

Figure 5:
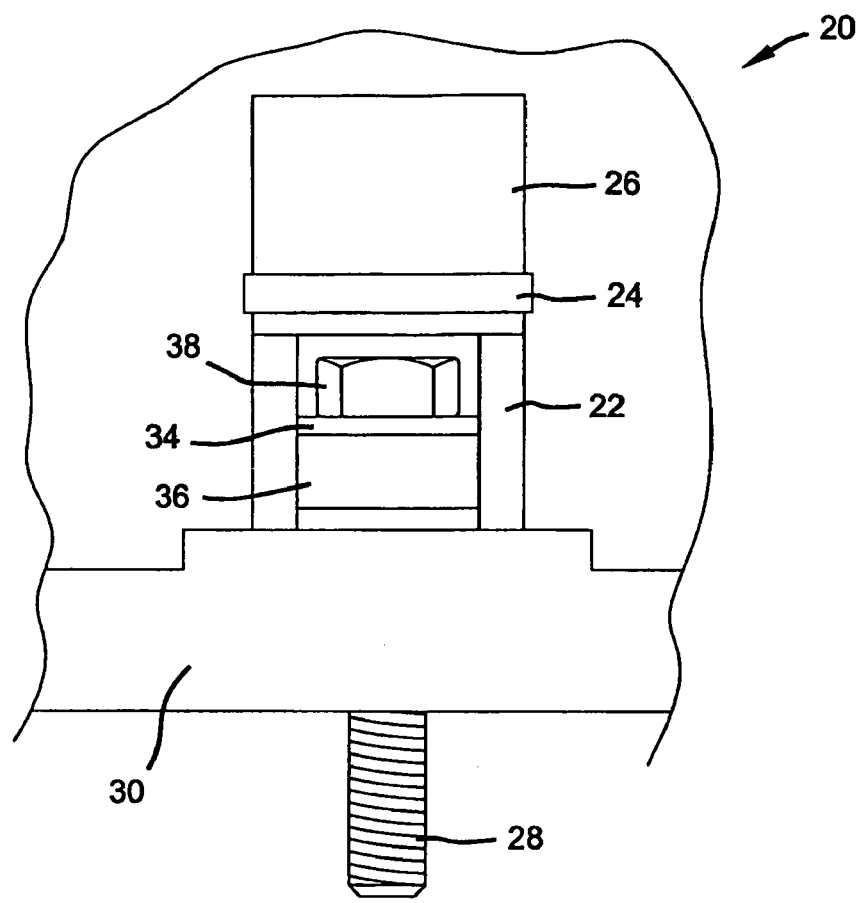
FIG. 5 is a side view of a tuned vibration absorber mounted to a cam cover via a cam cover bolt assembly according to the principles of the present invention.

For the embodiment, as illustrated in FIGS. 5 and 6, the base 22, spring 24, and mass 26 are preferably generally cylindrical in shape with a hollow central portion that will receive a bolt assembly 28. The hollow central portion allows the absorber 20 to be mounted to a cam cover 30 by employing one of the existing bolt holes that are already employed for mounting the cam cover 30. The bolt assembly 28 preferably includes a washer 34 and grommet 36 (best shown in FIG. 4) mounted under a bolt head 38 with the grommet 36 in contact with and securing the base 22 to the cam cover 30.

While the first embodiment illustrates the tuned vibration absorber mounted to a cam cover, it may be mounted to other vehicle components in which an undesirable vibration may be present. This invention is particularly well-suited for mounting to components that are already mounted with bolts, thus allowing for a quick and simple mounting method, as well as allowing for a retro-fit to absorb unwanted vibrations in vehicles that are already in service. For example, the absorber may be mounted to an exhaust manifold, an engine front cover, a vehicle exhaust system, and other vehicle and machine components other than for use in vehicles.

Figure 8:
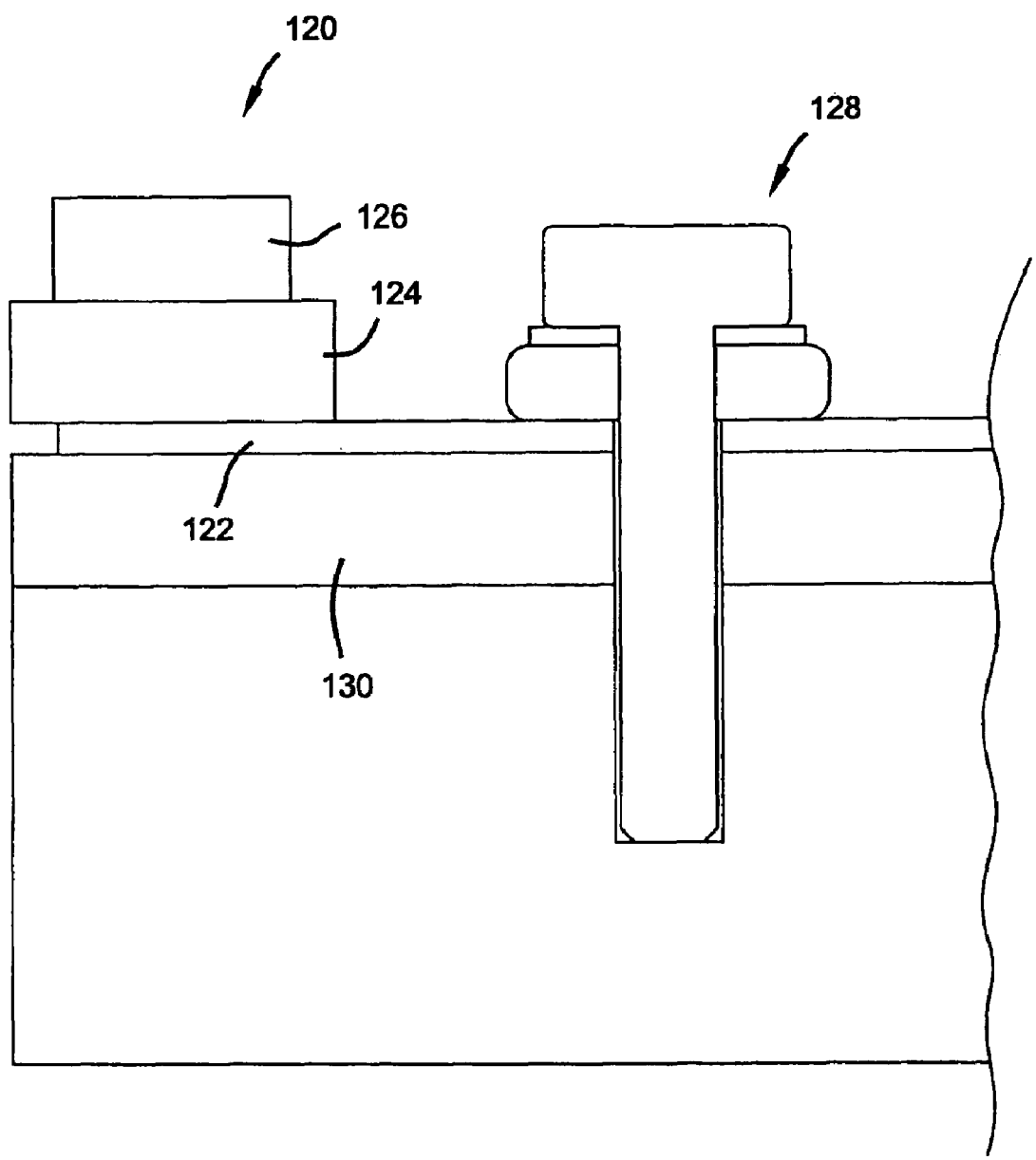
FIG. 8 is a side view of an alternate embodiment of the tuned vibration absorber mounted to a vehicle component according to the principles of the present invention.

FIG. 8 illustrates an alternative embodiment of the tuned vibration absorber in which the tuned vibration damper 120 is not mounted concentric with a bolt assembly 128. Instead, a relatively stiff cantilever base member 122 is mounted to the bolt assembly 128, with a spring 124 mounted thereon, and a mass 126 mounted on the spring 124. The bolt assembly 128 preferably mounts in an already existing bolt hole in a vehicle component 130. The tuned vibration damper 120 is spaced laterally from the bolt assembly 128 so as to be non-concentric to the bolt assembly.

In an additional alternative embodiment, the base may be integrally formed with a vehicle component, such as a valve cover, exhaust manifold, etc. The base may be formed onto an outer surface in order to provide ease of access to the absorber, or it may be formed onto an inner surface in order to hide the absorber from view. Also, for a multi-ply component, such as, for example, a two-ply, plastic cam cover, the absorber may be secured between the plies, with a cavity formed between the plies to receive the absorber.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An engine assembly comprising:
an engine body;
a cover member mounted to said engine body; and
a vibration absorber including a base member including a first mounting portion having an axially extending aperture therein and a second mounting portion axially spaced from said first mounting portion, a spring member mounted to said second mounting portion of said base member so as to be axially spaced from said first mounting portion, a mass member mounted to said spring member, and a bolt extending through said aperture in said first mounting portion of said base member for mounting said base member to said engine body and said cover member, said bolt including a head, said head and said base member defining a clamping region therebetween, said mass member and said spring member disposed exterior to said clamping region.

2. The vibration absorber according to claim 1, wherein said second mounting portion is concentric with said first mounting portion.

3. The vibration absorber according to claim 2, wherein said base member includes an axially extending bridge portion between said first mounting portion and said second mounting portion.

4. The vibration absorber according to claim 1, wherein said spring member is at least partially made of silicone.

5. The vibration absorber according to claim 1, wherein said spring member is at least partially made of rubber.

6. The vibration absorber according to claim 1, wherein said spring member is at least partially made of microcellular urethane.

7. The vibration absorber according to claim 1, wherein said spring member is at least partially made of an elastic foam.

8. The vibration absorber according to claim 1, further comprising a grommet disposed on said bolt.

9. The vibration absorber according to claim 1, wherein said spring member is mounted to said base member by an adhesive.

10. The vibration absorber according to claim 1, wherein said mass member is mounted to said spring member by an adhesive.

11. The vibration absorber according to claim 1, wherein said spring member is molded to said base member.

12. The vibration absorber according to claim 1, wherein said spring member is molded to said mass member.

13. The engine assembly of claim 1, wherein said cover member is a cam cover.

14. The engine assembly of claim 1, wherein said cover member is an exhaust manifold.

15. The engine assembly of claim 1, wherein said cover member is a front cover.

* * * * *